(12) United States Patent
Pelton et al.

(10) Patent No.: US 11,106,437 B2
(45) Date of Patent: Aug. 31, 2021

(54) LOOKUP TABLE OPTIMIZATION FOR PROGRAMMING LANGUAGES THAT TARGET SYNCHRONOUS DIGITAL CIRCUITS

(71) Applicant: MICROSOFT TECHNOLOGY LICENSING, LLC, Redmond, WA (US)

(72) Inventors: Blake D. Pelton, Redmond, WA (US); Adrian Michael Caulfield, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/247,250

(22) Filed: Jan. 14, 2019

(65) Prior Publication Data

US 2020/0225921 A1      Jul. 16, 2020

(51) Int. Cl.
*G06F 9/50*      (2006.01)
*G06F 9/38*      (2018.01)
(Continued)

(52) U.S. Cl.
CPC .......... *G06F 8/427* (2013.01); *G06F 16/9017* (2019.01); *G06F 8/34* (2013.01);
(Continued)

(58) Field of Classification Search
CPC ... H04L 45/60; G06F 17/142; G06F 17/5045; G06F 17/5054; G06F 17/505;
(Continued)

(56) References Cited

U.S. PATENT DOCUMENTS 5,343,554 A * 8/1994 Koza .................. G06N 3/126
706/13
5,416,719 A    5/1995 Pribetich
(Continued)

FOREIGN PATENT DOCUMENTS

WO    2016094012 A1    6/2016
WO    2017084104 A1    5/2017

OTHER PUBLICATIONS

Jason Cong et al., Combinational logic synthesis for LUT based filed programmable gate arrays, Apr. 1996, [Retrieved on Dec. 20, 2019]. Retrieved from the internet: <URL: https://dl.acm.org/citation.cfm?doid=233539.233540> 60 Pages (pp. 145-204) (Year: 1996).*

(Continued)

*Primary Examiner* — Anibal Rivera
(74) *Attorney, Agent, or Firm* — Newport IP, LLC; David W. Foster

(57) ABSTRACT

A programming language and a compiler are disclosed that optimize the use of look-up tables (LUTs) on a synchronous digital circuit (SDC) such as a field programmable gate array (FPGA) that has been programmed. LUTs are optimized by merging multiple computational operations into the same LUT. A compiler parses source code into an intermediate representation (IR). Each node of the IR that represents an operator (e.g. '&', '+') is mapped to a LUT that implements that operator. The compiler iteratively traverses the IR, merging adjacent LUTs into a LUT that performs both operations and performing input removal optimizations. Additional operators may be merged into a merged LUT until all the LUT's inputs are assigned. Pipeline stages are then generated based on merged LUTs, and an SDC is programmed based on the pipeline and the merged LUT.

20 Claims, 10 Drawing Sheets

(51) Int. Cl.
*G06F 8/41* (2018.01)
*G06F 16/901* (2019.01)
*G06F 16/33* (2019.01)
*G06F 8/34* (2018.01)
*G06F 16/2455* (2019.01)
*G06F 16/245* (2019.01)

(52) U.S. Cl.
CPC ............... *G06F 8/41* (2013.01); *G06F 8/443* (2013.01); *G06F 16/245* (2019.01); *G06F 16/2455* (2019.01); *G06F 16/33* (2019.01)

(58) Field of Classification Search
CPC ...... G06F 17/5068; G06F 21/76; G06F 8/443; G06F 8/34; G06F 8/41; G06F 8/427; G06F 16/9017; G06F 16/2455; G06F 16/33; G06F 16/245
See application file for complete search history.

(56) References Cited

U.S. PATENT DOCUMENTS

| | | | |
|---|---|---|---|
| 5,642,304 A * | 6/1997 | Simpson | G06F 9/30029 708/232 |
| 5,761,483 A * | 6/1998 | Trimberger | H03K 19/17704 716/117 |
| 5,909,572 A * | 6/1999 | Thayer | G06F 9/30167 712/226 |
| 6,061,521 A * | 5/2000 | Thayer | G06F 9/30014 708/520 |
| 6,112,019 A | 8/2000 | Chamdani et al. | |
| 6,212,601 B1 * | 4/2001 | Shiell | G06F 9/30032 711/118 |
| 6,275,508 B1 | 8/2001 | Aggarwal et al. | |
| 6,597,664 B1 | 7/2003 | Mithal et al. | |
| 7,028,281 B1 * | 4/2006 | Agrawal | H03K 19/17728 326/41 |
| 7,111,273 B1 * | 9/2006 | Ganesan | G06F 30/34 326/39 |
| 7,203,718 B1 * | 4/2007 | Fu | G06F 7/5446 708/622 |
| 7,305,582 B1 | 12/2007 | Moser et al. | |
| 7,315,991 B1 | 1/2008 | Bennett | |
| 7,375,550 B1 | 5/2008 | Redgrave et al. | |
| 7,386,820 B1 | 6/2008 | Koelbl et al. | |
| 7,415,681 B2 * | 8/2008 | Tomar | G06F 30/34 716/104 |
| 7,471,104 B1 * | 12/2008 | Chirania | H03K 19/1737 326/38 |
| 7,516,446 B2 | 4/2009 | Choi et al. | |
| 7,647,567 B1 | 1/2010 | Esposito et al. | |
| 7,735,047 B1 * | 6/2010 | Anderson | G06F 30/34 716/116 |
| 7,735,050 B2 * | 6/2010 | Yu | G06F 30/30 716/104 |
| 7,823,117 B1 | 10/2010 | Bennett | |
| 7,844,924 B2 * | 11/2010 | Sasao | G06F 17/5054 703/16 |
| 8,095,508 B2 * | 1/2012 | Chamberlain | G06F 21/76 707/636 |
| 8,209,580 B1 * | 6/2012 | Varnica | H03M 13/1102 714/752 |
| 8,468,510 B1 | 6/2013 | Sundararajan et al. | |
| 8,599,049 B2 * | 12/2013 | Wang | H03M 7/4056 341/106 |
| 8,620,881 B2 * | 12/2013 | Chamberlain | G06F 3/0655 707/693 |
| 8,656,347 B2 | 2/2014 | Ito | |
| 8,671,371 B1 | 3/2014 | Dimond | |
| 8,775,986 B1 | 7/2014 | Mohan et al. | |
| 8,881,079 B1 | 11/2014 | Pan et al. | |
| 8,930,926 B2 | 1/2015 | Bastoul et al. | |
| 9,471,307 B2 | 10/2016 | Giroux et al. | |
| 9,690,278 B1 | 6/2017 | Chen et al. | |
| 9,824,756 B2 * | 11/2017 | Brand | G11C 15/00 |
| 9,846,623 B2 | 12/2017 | Jennings et al. | |
| 9,858,373 B2 | 1/2018 | Cho et al. | |
| 10,162,918 B1 * | 12/2018 | Iyer | G06F 30/3312 |
| 10,331,836 B1 * | 6/2019 | Hosangadi | G06F 30/30 |
| 10,419,338 B2 * | 9/2019 | Gray | H04L 45/60 |
| 10,474,533 B2 | 11/2019 | Jennings et al. | |
| 2002/0080174 A1 | 6/2002 | Kodosky et al. | |
| 2003/0154466 A1 * | 8/2003 | Snider | G06F 30/34 717/138 |
| 2005/0050531 A1 | 3/2005 | Lee | |
| 2006/0075180 A1 * | 4/2006 | Tian | G06F 30/30 711/1 |
| 2006/0120189 A1 | 6/2006 | Beerel et al. | |
| 2006/0268939 A1 * | 11/2006 | Dries | H04J 3/247 370/498 |
| 2007/0094474 A1 * | 4/2007 | Wilson | G09C 1/00 711/206 |
| 2007/0143717 A1 | 6/2007 | Koelbl et al. | |
| 2007/0171101 A1 * | 7/2007 | Siemers | G06F 15/7867 341/51 |
| 2007/0174804 A1 * | 7/2007 | Sasao | G06F 30/34 716/103 |
| 2007/0180334 A1 | 8/2007 | Jones et al. | |
| 2007/0300192 A1 | 12/2007 | Curtin et al. | |
| 2008/0005357 A1 | 1/2008 | Malkhi et al. | |
| 2008/0075278 A1 * | 3/2008 | Gaubatz | G09C 1/00 380/30 |
| 2008/0111721 A1 * | 5/2008 | Reznik | H04N 19/61 341/67 |
| 2008/0111722 A1 * | 5/2008 | Reznik | H03M 7/40 341/67 |
| 2008/0229141 A1 | 9/2008 | Chang et al. | |
| 2008/0313579 A1 | 12/2008 | Larouche et al. | |
| 2009/0210412 A1 * | 8/2009 | Oliver | G06F 7/02 |
| 2009/0243732 A1 * | 10/2009 | Tarng | H03B 5/1228 331/18 |
| 2010/0162049 A1 | 6/2010 | Stall et al. | |
| 2011/0078640 A1 * | 3/2011 | Bruneel | G06F 30/34 716/102 |
| 2012/0065956 A1 | 3/2012 | Irturk et al. | |
| 2013/0013301 A1 * | 1/2013 | Subbaraman | G10L 19/002 704/206 |
| 2013/0054939 A1 | 2/2013 | Felch | |
| 2013/0081060 A1 | 3/2013 | Otenko | |
| 2013/0100750 A1 * | 4/2013 | Ishiguro | G11C 7/00 365/189.011 |
| 2013/0111425 A1 | 5/2013 | Kumar et al. | |
| 2013/0111453 A1 | 5/2013 | Kalogeropulos et al. | |
| 2013/0125097 A1 | 5/2013 | Ebcioglu et al. | |
| 2013/0139122 A1 * | 5/2013 | Pell | G06F 30/327 716/117 |
| 2013/0212365 A1 | 8/2013 | Chen et al. | |
| 2013/0226594 A1 * | 8/2013 | Fuchs | G10L 19/008 704/500 |
| 2013/0298130 A1 | 11/2013 | Pienaar et al. | |
| 2013/0335853 A1 * | 12/2013 | Li | G11B 5/5547 360/75 |
| 2014/0059524 A1 * | 2/2014 | Kee | G06F 8/34 717/154 |
| 2014/0237437 A1 * | 8/2014 | Mang | G06F 30/327 716/104 |
| 2015/0052298 A1 * | 2/2015 | Brand | G11C 15/00 711/108 |
| 2015/0178418 A1 | 6/2015 | Gu et al. | |
| 2015/0178435 A1 | 6/2015 | Kumar | |
| 2015/0295552 A1 * | 10/2015 | Abou-Chahine | H03F 3/245 455/561 |
| 2015/0304068 A1 * | 10/2015 | Xiong | H03F 1/3241 375/267 |
| 2016/0087651 A1 * | 3/2016 | Lu | H03M 13/3994 714/779 |
| 2016/0180001 A1 | 6/2016 | Adler | |
| 2016/0246571 A1 * | 8/2016 | Walters, III | G06F 7/575 |
| 2016/0259023 A1 | 9/2016 | Overall et al. | |
| 2016/0299998 A1 | 10/2016 | Isshiki | |

(56) References Cited

U.S. PATENT DOCUMENTS

| | | | |
|---|---|---|---|
| 2016/0344629 A1* | 11/2016 | Gray | H04L 45/60 |
| 2017/0140513 A1* | 5/2017 | Su | G06T 5/007 |
| 2017/0185508 A1 | 6/2017 | Looney et al. | |
| 2017/0192921 A1 | 7/2017 | Wang et al. | |
| 2017/0251211 A1* | 8/2017 | Froehlich | H04N 19/124 |
| 2017/0277656 A1* | 9/2017 | John | G06F 17/142 |
| 2017/0315815 A1* | 11/2017 | Smith | G06F 9/3818 |
| 2017/0316154 A1 | 11/2017 | Fitch et al. | |
| 2018/0129475 A1* | 5/2018 | Almagambetov | G06F 7/4824 |
| 2018/0143872 A1* | 5/2018 | Sun | H03M 13/6502 |
| 2018/0232475 A1 | 8/2018 | Derisavi et al. | |
| 2018/0253368 A1 | 9/2018 | Villarreal et al. | |
| 2018/0255206 A1* | 9/2018 | Kim | H04N 1/6005 |
| 2018/0330022 A1 | 11/2018 | Choi et al. | |
| 2018/0342040 A1 | 11/2018 | Nguyen et al. | |
| 2018/0347498 A1* | 12/2018 | Maloney | F02D 41/2422 |
| 2019/0114548 A1 | 4/2019 | Wu et al. | |
| 2019/0138365 A1* | 5/2019 | Purnell | G06F 13/28 |
| 2019/0286973 A1* | 9/2019 | Kovvuri | G06F 8/451 |
| 2019/0303153 A1* | 10/2019 | Halpern | G06F 9/3836 |
| 2020/0167139 A1 | 5/2020 | Drepper | |
| 2020/0225919 A1 | 7/2020 | Pelton et al. | |
| 2020/0225920 A1 | 7/2020 | Pelton et al. | |
| 2020/0226051 A1 | 7/2020 | Pelton et al. | |
| 2020/0226227 A1 | 7/2020 | Pelton et al. | |
| 2020/0226228 A1 | 7/2020 | Pelton et al. | |
| 2021/0049163 A1* | 2/2021 | Levy | G06F 16/245 |

OTHER PUBLICATIONS

Jason Cong et al., Combinational Logic Synthesis for LUT Based Field Programmable Gate Arrays, 1996, [Retrieved on Feb. 19, 2021]. Retrieved from the internet: <URL: https://dl.acm.org/doi/pdf/10.1145/233539.233540> 60 Pages (pp. 145-204) (Year: 1996).*
Rashid Hatami et al., High Performance Architecture for Flow-Table Lookup in SDN on FPGA, 2018, [Retrieved on Feb. 19, 2021]. Retrieved from the internet: <URL: https://arxiv.org/ftp/arxiv/papers/1801/1801.00840.pdf> 15 Pages (pp. 1-15) (Year: 2018).*
Tan, et al., "Mapping-Aware Constrained Scheduling for LUT-Based FPGAs", In Proceedings of the ACM/SIGDA International Symposium on Field-Programmable Gate Arrays, Feb. 22, 2015, 10 Pages.
"Ex Parte Quayle Action Issued in U.S. Appl. No. 16/247,261", Mailed Date: Feb. 4, 2020, 7 Pages.
"International Search Report and Written Opinion Issued in PCT Application No. PCT/US2019/069030", dated Mar. 27, 2020, 11 Pages.
Ditmar, et al., "Function Call Optimisation in SystemC Hardware Compilation", In Proceedings of 4th Southern Conference on Programmable Logic, Mar. 26, 2008, pp. 93-98.
"International Search Report and Written Opinion Issued in PCT Application No. PCT/US2019/069028", dated Apr. 24, 2020, 13 Pages.
"International Search Report and Written Opinion Issued in PCT Application No. PCT/US2019/069031", dated May 4, 2020, 13 Pages.
"International Search Report and Written Opinion Issued in PCT Application No. PCT/US2019/069032", dated Apr. 24, 2020, 13 Pages.
"International Search Report and Written Opinion Issued in PCT Application No. PCT/US2020/012278", dated Apr. 6, 2020, 15 Pages.
"International Search Report and Written Opinion Issued in PCT Application No. PCT/US2019/069034", dated Jun. 23, 2020, 19 Pages.
Galloway, et al., "The Transmogrifier C Hardware Description Language and Compiler for FPGAs", In Proceedings IEEE Symposium on FPGAs for Custom Computing Machines, Apr. 19, 1995, pp. 136-144.
Arar, Steve, "Concurrent Conditional and Selected Signal Assignment in VHDL", https://www.allaboutcircuits.com/technical-articles/concurrent-conditional-and-selected-signal-assignment-in-vhdl/, Jan. 3, 2018, 8 Pages.
"Non-Final Office Action Issued in U.S. Appl. No. 16/247,181", dated Jul. 9, 2020, 11 Pages.
"Non Final Office Action Issued in U.S. Appl. No. 16/247,226", dated Sep. 4, 2020, 33 Pages.
"Non-Final Office Action Issued in U.S. Appl. No. 16/247,203", dated Nov. 9, 2020, 8 Pages.
"Final Office Action Issued in U.S. Appl. No. 16/247,181", dated Jan. 28, 2021, 16 Pages.
"Final Office Action Issued in U.S. Appl. No. 16/247,269", dated Oct. 16, 2020, 15 Pages.
Operand Forwarding, Retrieved From: https://en.wikipedia.org/w/index.php?title=Operand_forwarding&oldid=868126536, Retrieved on: Nov. 10, 2018, 2 Pages.
"Register File", Retrieved From: https://en.wikipedia.org/w/index.php?title=Register_file&oldid=923242007, Retrieved on: Oct. 27, 2019, 8 Pages.
"Re-order Buffer", Retrieved From: https://en.wikipedia.org/w/index.php?title=Re-order_buffer&oldid=928835149 Retrieved on: Dec. 1, 2019, 1 Page.
"Ex Parte Quayle Action Issued in U.S. Appl. No. 16/247,261", dated Feb. 4, 2020, 7 Pages.
"Non Final Office Action Issued In U.S. Appl. No. 16/247,269", dated Feb. 20, 2020, 14 Pages.
"Final Office Action Issued in U.S. Appl. No. 16/247,203", dated Apr. 1, 2021, 6 Pages.
"Final Office Action Issued in U.S. Appl. No. 16/247,226", dated Mar. 18, 2021, 41 Pages.
"Notice of Allowance Issued in U.S. Appl. No. 16/247,203", dated Jun. 3, 2021, 8 Pages.
"Non Final Office Action Issued in U.S. Appl. No. 16/247,181", dated Jun. 9, 2021, 13 Pages.
"Notice of Allowance Issued in U.S. Appl. No. 16/247,226", dated Jun. 25, 2021, 14 Pages.
Steinberg, et al., "Automatic High-level Programs Mapping onto Programmable Architectures", In Proceedings of International Conference on Parallel Computing Technologies, Jul. 25, 2015, pp. 474-485.

* cited by examiner

LOOKUP TABLE OPTIMIZATION FOR PROGRAMMING LANGUAGES THAT TARGET SYNCHRONOUS DIGITAL CIRCUITS

BACKGROUND

Hardware description languages ("HDLs") are modeling languages used by hardware engineers to describe the structure and behavior of electronic circuits, most commonly digital logic circuits. Examples of HDLs include Very High Speed Integrated Circuit ("VHSIC") HDL and VERILOG.

HDLs commonly require many lines of code to model digital logic circuits. Even for hardware engineers that are very familiar with HDLs, creation of such code can be extremely time consuming. Moreover, the more lines of code present in a design, the more likely it is for the design to include errors or perform poorly.

Because HDLs typically utilize a different programming paradigm than imperative programming languages, software engineers that are not intimately familiar with HDLs commonly have a very difficult time utilizing these languages. As a result, electronic circuits generated from HDL created by software engineers can also include errors or perform poorly.

It is with respect to these and other technical challenges that the disclosure made herein is presented.

SUMMARY

Technologies are disclosed for a optimizing the use of look-up tables (LUTs) on a synchronous digital circuit (SDC) such as a field programmable gate array (FPGA) that has been programmed. Through implementations of the disclosed technologies, hardware engineers can realize significant performance gains and hardware efficiencies by reducing the number of LUTs required to implement some types of circuit designs, while at the same time improving performance. For software engineers who have little or no experience with using HDLs to design circuits, the disclosed technologies offer a familiar programming paradigm that can be used to generate high performance circuit designs. Other technical benefits not specifically mentioned herein can also be realized through implementations of the disclosed subject matter.

In order to realize the technical benefits mentioned briefly above, LUTs are optimized by merging multiple computational operations into the same LUT, and by identifying inputs that are invariant or can otherwise be omitted. Computational operations are merged before pipeline stages are defined. This allows a broader range of optimizations than if pipeline stages are defined first and then optimizations are applied within a given pipeline stage. Optimizations are applied iteratively, along with conventional optimizations, such that it may be determined that a merged LUT can omit an input, making the LUT available for further merges.

In some configurations, a compiler parses source code into an abstract syntax tree (AST). The AST may be converted into an intermediate representation (IR)—a data structure used internally by a compiler. The IR may include a set of functions (one for each function identified in the source code), each of which includes a set of basic blocks, each of which includes a sequence of computational operations. Each computational operation of the IR that represents an operator (e.g. '&', '+') is mapped to one or more LUTs that implement the operator. In some configurations, the compiler traverses the IR, merging two (or more) LUTs into a single LUT that performs both (or more) operations. Additional operators may be merged into a merged LUT until all the LUT's inputs are utilized. Additionally, or alternatively, the compiler may infer that a LUT input has a particular value and use this information to perform additional optimizations, e.g. by removing an input from the LUT. The compiler may iteratively merge LUTs, identify constraints on input values, omit input variables when the LUT's output doesn't depend on them, and apply other optimizations to further reduce the number of pipeline stages, SDC area, and execution time. Pipeline stages are then generated based on merged LUTs.

The expression "z=(a & b)|c", for example, may be parsed into an IR with a node for the '&' operator and a node for the operator. Each node may be replaced with a corresponding LUT (e.g. the truth tables for '&' and '|'). As the compiler traverses the IR, the truth tables for '&' and '|' may be combined into a single table that takes three inputs (a, b, and c) and provides an output based on the expression "(a & b)|c". The resulting LUT is then output as a single pipeline stage.

In some configurations, the compiler further optimizes LUTs by performing a bitwise analysis of variables. For example, if the expression "(a & b)|c" is performed on eight-bit values 'a', 'b' and 'c', LUT merging is performed on eight different IRs, one for each bit. If the compiler can infer a constraint on one bit but not another, it will optimize the IR for the one bit. For example, if the compiler infers that the second bit of 'b' is always 1, 'b' will be omitted from the LUT that performs "a & b" for the second bit. However, if the same cannot be shown for the first or third bits, 'b' will still be a parameter for the corresponding LUTs. Optimizing a LUT to omit a parameter allows additional operations to be merged into that LUT.

In some configurations, bitwise LUT optimization is extended across basic programming blocks—i.e. sequences of expressions that upon entry have only one exit. The compiler may analyze a basic block in a function, its immediate predecessors, and the other basic blocks within the function. If a constraint can be inferred about a variable as it enters a basic block based on the values provided by the immediate predecessors and within the function, optimizations may be performed within the basic block. For example, if the fifth bit of 'b' in "a & b" is known to be '1' based on an analysis of predecessor blocks, then the LUT performing the fifth bit of "a & b" may be optimized to output the value of 'a' (because 'x AND 1=x for any x).

In some scenarios, a variable output by a basic block is used as input to one of its predecessors (e.g. in a for-loop). In this case, constraints inferred about the variable may be used to further optimize the predecessor block. This may allow a cascade of optimizations, as new constraints realized in the predecessor block may allow further optimization of the basic block, etc.

Implementations of the technologies disclosed herein can reduce SDC area, the number of pipeline stages, the number of registers used to pass data between pipeline stages, and the number of clock cycles used to perform a given computational expression. Other technical benefits not specifically identified herein can also be realized through implementations of the disclosed technologies.

It should be appreciated that the above-described subject matter can be implemented as a computer-controlled apparatus, a computer-implemented method, a computing device, or as an article of manufacture such as a computer readable medium. These and various other features will be apparent from a reading of the following Detailed Description and a review of the associated drawings.

This Summary is provided to introduce a brief description of some aspects of the disclosed technologies in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
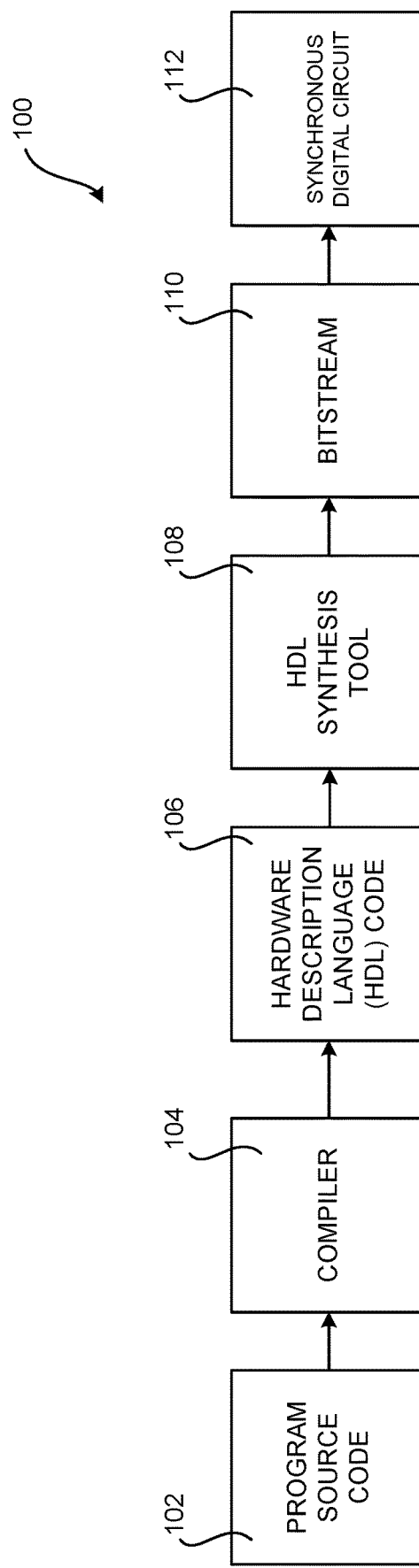
FIG. 1 is a computing architecture diagram that shows aspects of a system disclosed herein for generating a synchronous digital circuit based on program source code that includes a programming construct that maps to the synchronous digital circuit.

The following detailed description is directed to a high-level language and a compiler that optimizes the use of LUTs. As discussed briefly above, implementations of the technologies disclosed herein reduce SDC area, the number of pipeline stages, the number of registers used to pass data between pipeline stages, and the number of clock cycles used to perform a given computational expression. These technical benefits are achieved by reducing the number of LUTs, clock cycles, and registers used to perform a given functionality. Other technical benefits not specifically mentioned herein can also be realized through implementations of the disclosed subject matter.

While the subject matter described herein is presented in the general context of SDCs executing on personal computers, those skilled in the art will recognize that other implementations can be performed in combination with other types of computing systems and modules. Those skilled in the art will also appreciate that the subject matter described herein can be practiced with other computer system configurations, including hand-held devices, multiprocessor systems, microprocessor-based or programmable consumer electronics, computing or processing systems embedded in devices (such as wearable computing devices, automobiles, home automation etc.), minicomputers, mainframe computers, and the like.

In the following detailed description, references are made to the accompanying drawings that form a part hereof, and which are shown by way of illustration specific configurations or examples. Referring now to the drawings, in which like numerals represent like elements throughout the several FIGS., aspects of lookup table optimization for programming languages that target SDCs will be described.

FIG. 1 is a computing architecture diagram that shows aspects of an illustrative system 100 disclosed herein for defining and generating a synchronous digital circuit ("SDC") 112 based on program source code 102 that includes a programming construct that maps to the SDC 112. SDCs 112 can be implemented by Gate Arrays, FPGAs, Application Specific Integrated Circuits ("ASICs"), and other types of circuit devices. While the disclosed subject matter is primarily described in the context of an SDC 112 implemented in an FPGA, it is to be appreciated that the technologies disclosed herein can be utilized to define SDCs 112 that are implemented using other types of devices.

As illustrated in FIG. 1, the illustrative system 100 includes a compiler 104 that compiles program source code 102 to generate hardware description language ("HDL") code 106 or a lower-level representation of a circuit, such as a netlist. As discussed briefly above, HDLs are modeling languages used by hardware engineers to describe the structure and behavior of electronic circuits, most commonly digital logic circuits. Examples of HDLs include VHSIC HDL and VERILOG.

As will be described in detail below, the program source code 102 is expressed using a multi-threaded imperative programming language designed to target SDCs 112. The disclosed language provides many of the features of languages such as 'C' and 'JAVA, such as function calls, for-loops, arithmetic operators, and conditional statements. However, the disclosed language includes constructs that map directly to an underlying SDC 112 hardware implementation. This enables both hardware and software engineers to reason about performance, and to be effective in optimizing their designs. As mentioned above, this can also make the language familiar to software engineers, and free hardware engineers from dealing with whole classes of bugs that arise when coding in an HDL.

The disclosed multi-threaded imperative programming language is imperative in that program statements are executed one after another, and multi-threaded in that multiple threads of execution can be executing in parallel. As discussed above, a thread is a collection of local variables that are executed as the local variables are processed by a hardware circuit.

The threads described herein are analogous to, yet different, from software threads. While a software thread maintains a call stack containing local variables and executes code in memory, the threads described herein are collections of local variables that move through hardware circuits. While a software thread has a location in executable code determined by an instruction pointer, the disclosed thread has a physical location on the SDC at a given point in time. SDCs may execute hundreds, thousands, or even millions of threads, and SDC execution may be pipelined—i.e. different threads may execute within different stages of a circuit at the same time.

As will be described in greater detail below, language constructs can be defined in the program source code 102 that map to a circuit implementation. A language construct is a syntactically allowable part of a program that may be formed from one or more lexical tokens. The language constructs described herein map to circuit implementations that guarantee thread ordering (i.e. that threads will exit a circuit implementation in the same order that they entered).

As will also be described in greater detail below, the circuit implementations generated by the constructs disclosed herein can be implemented as an SDC in an FPGA, a gate array, an ASIC, or another type of suitable device. Another hardware component, such as a NIC, can be configured with the FPGA, gate array, or ASIC, in order to implement desired functionality.

As shown in FIG. 1, a compiler 104 can compile the program source code 102 including one or more of the language constructs disclosed herein to a circuit description, HDL code 106 in this example. The HDL code 106 can be provided to an HDL synthesis tool 108 which, in turn, can generate a bitstream 110 that can be utilized to program an SDC 112, such as for instance on an FPGA. When targeting an ASIC, the HDL code 106 can be provided to an ASIC fabricator for production in a factory.

Figure 2:
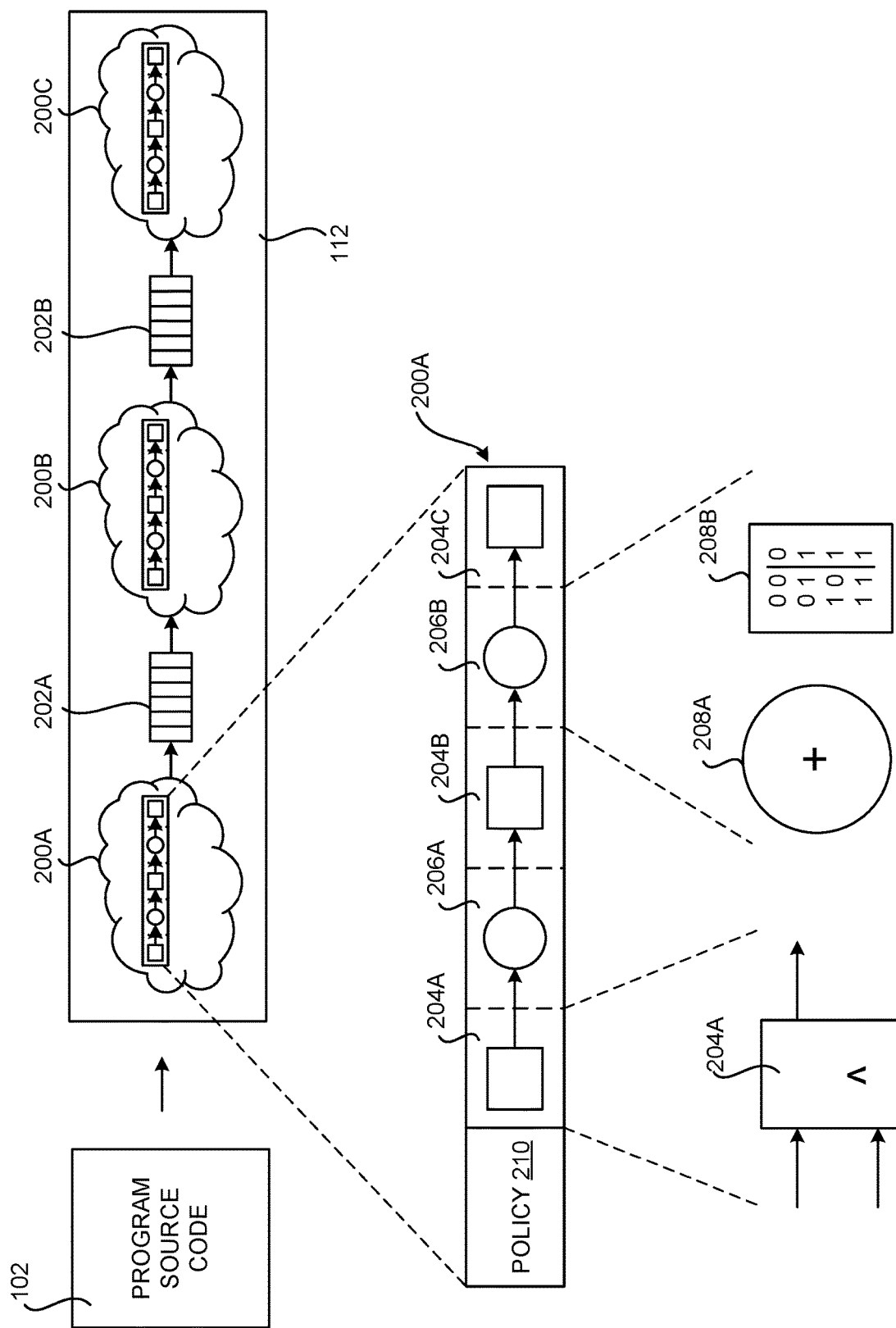
FIG. 2 is a hardware architecture diagram showing aspects of an illustrative example synchronous digital circuit, that includes several hardware pipelines, each having multiple pipeline stages, and computational units that can be defined and implemented using the disclosed technologies.

FIG. 2 is a hardware architecture diagram showing aspects of an illustrative example SDC 112 that includes several hardware pipelines 200A-200C (or "pipelines") that can be defined and implemented using the disclosed technologies. Each hardware pipeline has multiple pipeline stages 206, each of which has computational units 208. As shown in FIG. 2, the program source code 102 can be compiled into pipelines 200A-200C of hardware computational units 208.

The pipelines 200A-200C can be connected by first-in-first-out ("FIFO") queues (which might be referred to herein as "FIFOs" or "queues"). The pipelines 200A-200C implement the functionality defined by the program source code 102. The FIFOs 202 store data values, providing input to pipelines 200 as well as storing output generated by pipelines 200. For example, the SDC 112 includes a pipeline 200A that feeds its output to the FIFO 202A. Pipeline 200B, in turn, obtains its input from the FIFO 202A and provides its output to the FIFO 202B. The pipeline 200C obtains its input from the FIFO 202B.

In some configurations, the pipelines 200 implement a policy circuitry 210 that determines when to retrieve the next value(s) from a FIFO 202. For example, policy circuit 210 may require that an input FIFO (e.g. the FIFO 202A in the case of the pipeline 200B) is not empty and an output FIFO (e.g. the FIFO 202B) is not full before retrieving a value from the input FIFO (e.g. the FIFO 202A) for processing.

As shown in FIG. 2, a pipeline 200 may consist of one or more pipeline stages 206A-206B. Execution is pipelined by executing different threads in different stages 206 of a pipeline 200 concurrently. The results of stages can be stored in registers 204 and provided to the next stage 206 for the duration of the next clock cycle.

Each pipeline stage 206 can include one or more computational units 208, such as adder 208A and lookup table ("LUT") 208B. In the illustrated example, adder 208A can perform basic arithmetic, e.g. addition, subtraction, or multiplication. Computational units can also implement Boolean operators (e.g. "OR", "NOR", "XOR", etc.) or other custom logic provided by the SDC manufacturer.

Computational units can also be implemented by user-programmable lookup tables 208B. The illustrated LUT 208B depicts a two-input truth table that maps two input bits to a single output bit. LUTs 208B can be configured to support different numbers of input bits. To generate more complex output values, e.g. characters or 8-bit integers, multiple LUTs 208B, each connected to a different bit of an input variable, may be used.

Computational units can temporarily store results in registers 204 (or "flip-flops"). The contents of such a register can be provided to other computation units in the same or different pipeline 200. Registers 204 can capture a value at an input when a connected digital clock transitions from 0 to 1, and provide that value at an output until the end of the next clock cycle (i.e. until the clock transitions from 0 to 1 again). Registers can also include an enable line. If an enable line is set to false, then the register will not perform the operations described above, maintaining the current output value over multiple clock cycles.

It is to be appreciated that the pipeline architecture shown in FIG. 2 has been simplified for discussion purposes. The programming language constructs described herein can be utilized to implement much more complex SDCs 112 that include many more components than illustrated in FIG. 2.

Figure 3:
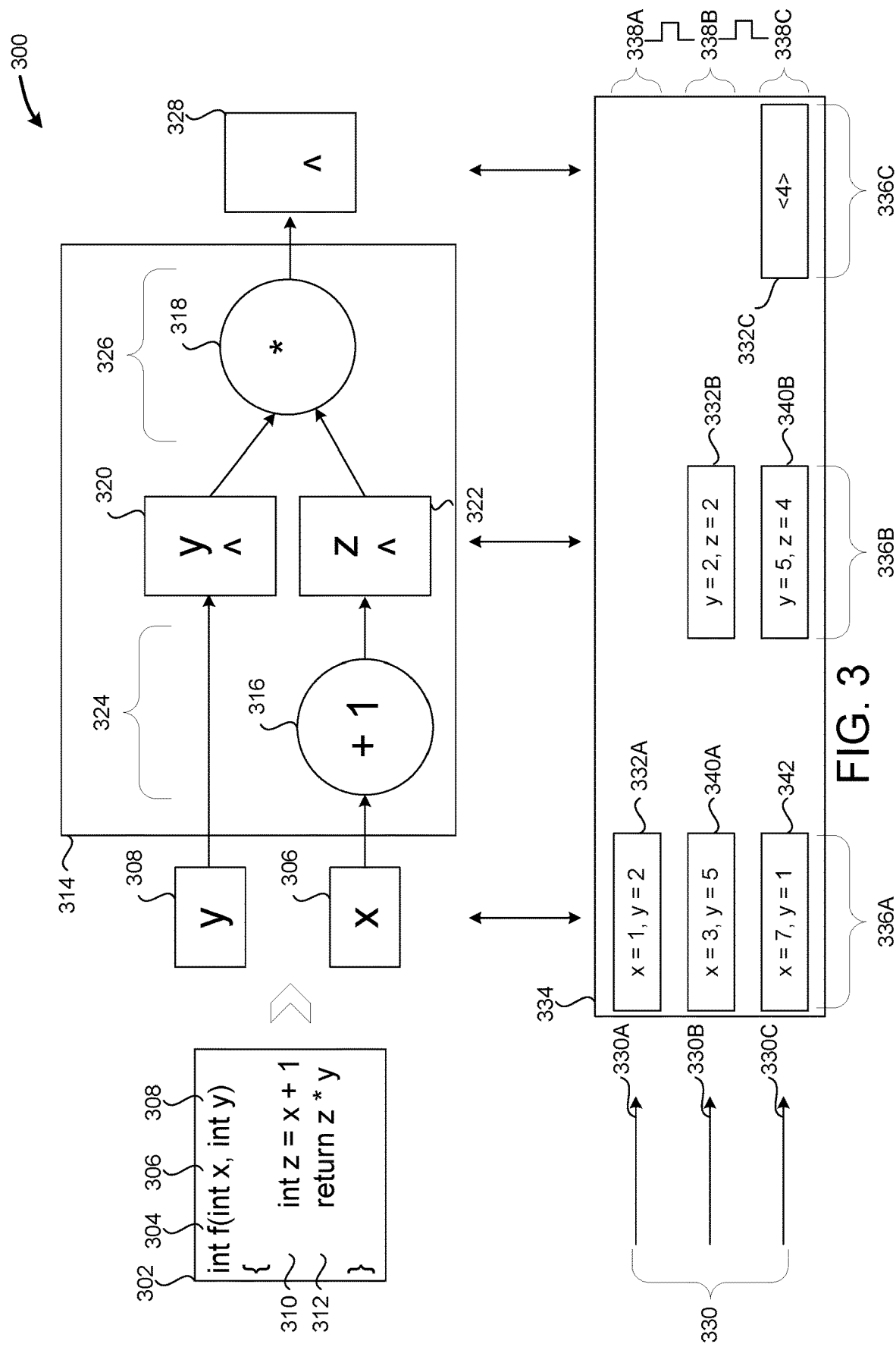
FIG. 3 is a hardware architecture diagram that shows mapping a function written in the disclosed language to a hardware circuit.

FIG. 3 is a hardware architecture diagram 300 that shows aspects of one mechanism disclosed herein for mapping a function written in the disclosed language to a hardware circuit, according to one embodiment. Program source code 302 includes a function 'f( )' 304 written in the disclosed language. Function 'f( )' 304 takes two parameters, 'x' 306 and 'y' 308, and returns an integer. Function 'f( )' 304 has two expressions: expression 310 performs an addition and stores the result in local variable 'z', while expression 312 returns the result of a multiplication.

Function 'f( )' is 304 mapped to a hardware circuit 314, which includes computational units 316 and 318 and registers 320 and 322. Hardware circuit 314 has two stages—a first stage 324 that performs the addition described in expression 310, and a second stage 326 that performs the multiplication described in expression 312. Each stage is executed in a single clock cycle, and the result of each stage is stored in a register.

Continuing the example, stage 324 performs a "+1" operation on parameter 'x' 306, storing the result ('z') in register 322. During stage 324, parameter 'y' 308 is provided to register 320 directly. During stage 326, computational unit 318 multiplies the values of 'y' and 'z'. The result is stored in register 328.

Hardware circuit 314 may be executed by threads 330, only some of which are depicted. SDCs may execute hundreds, thousands, or millions of threads. As mentioned above, a thread is a collection of local variables that is executed as the local variables are processed by a hardware circuit. For example, thread 330A has the values 332 (x=1 and y=2), and thread 330A executes function 'f( )' 304 as the values 332 are processed by hardware circuit 314. Values returned by a function may be added to a set of local variables, and at any time if it is known that a particular variable will no longer be used by a hardware circuit, that variable may be removed from the set of local variables.

SDC execution may be pipelined—i.e. different threads may execute within different stages of a circuit at the same time. Table 334 depicts variables from different threads in different stages as pipelined execution of hardware circuit 314 occurs. Columns 336 display values stored between (i.e.

before and after) stages: 336A contains values of x and y provided by threads 330A, 330B, and 330C, while column 336B contains values after stage 324 has been executed and column 336C contains values after stage 326 has been executed. Rows 338A-C display values stored after successive clock cycles.

For instance, row 338A indicates that thread 330A is about to enter hardware circuit 314 with the values 332A (x=1 and y=2). Between rows 338A and 338B, a clock cycle occurs, and the results of executing thread 330A in stage 324 are depicted in 332B (y=2, a holdover from 332A, and z=2, the result of the "+1" operation). At the same time, the values 340A from thread 330B (x=3 and y=5) are about to enter hardware circuit 314. Between rows 338B and 338C another clock cycle occurs, and the result of thread 330A executing stage 326 is depicted in 332C ("4"). At the same time, the result of thread 330B executing stage 324 is depicted in 340B (y=5 and z=4), and the values 342 from thread 330C are about to enter hardware circuit 314 (x=7 and y=1). Pipelined execution enables higher throughput by increasing SDC utilization—i.e. more of the SDC is performing useful work at a given point in time than if only one thread at a time could execute hardware circuit 305.

Figure 4:
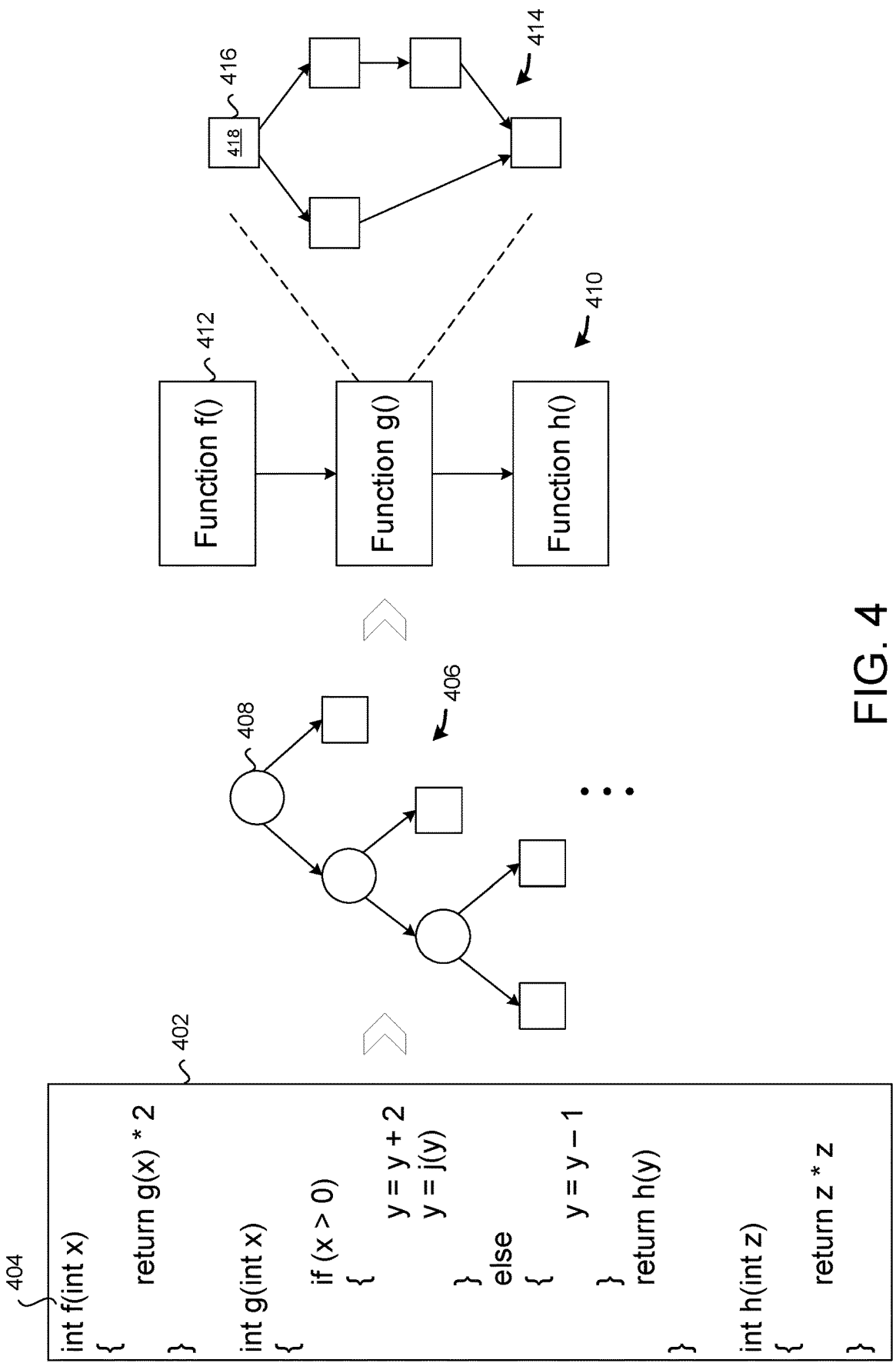
FIG. 4 is a block diagram that shows how code is parsed into an AST and converted to an IR.

FIG. 4 is a block diagram that shows how code is parsed into an AST and converted to an IR. In some configurations, source code 402 is compiled by compiler 104 into an AST 404. In this example, source code 402 includes three functions, 'f( )', 'g( )', and 'h( )', where 'f( )' calls 'g( )', which calls 'h( )'. AST 404 includes operator nodes, e.g. operator node 406, and operands, e.g. operand 408. AST 404 may be used to generate an IR 410, which has a set of functions 412, each of which is broken into a set of basic blocks 416, each of which includes a sequence of computational units. For example, IR 414 implements function 'g( )'.

Figure 5:
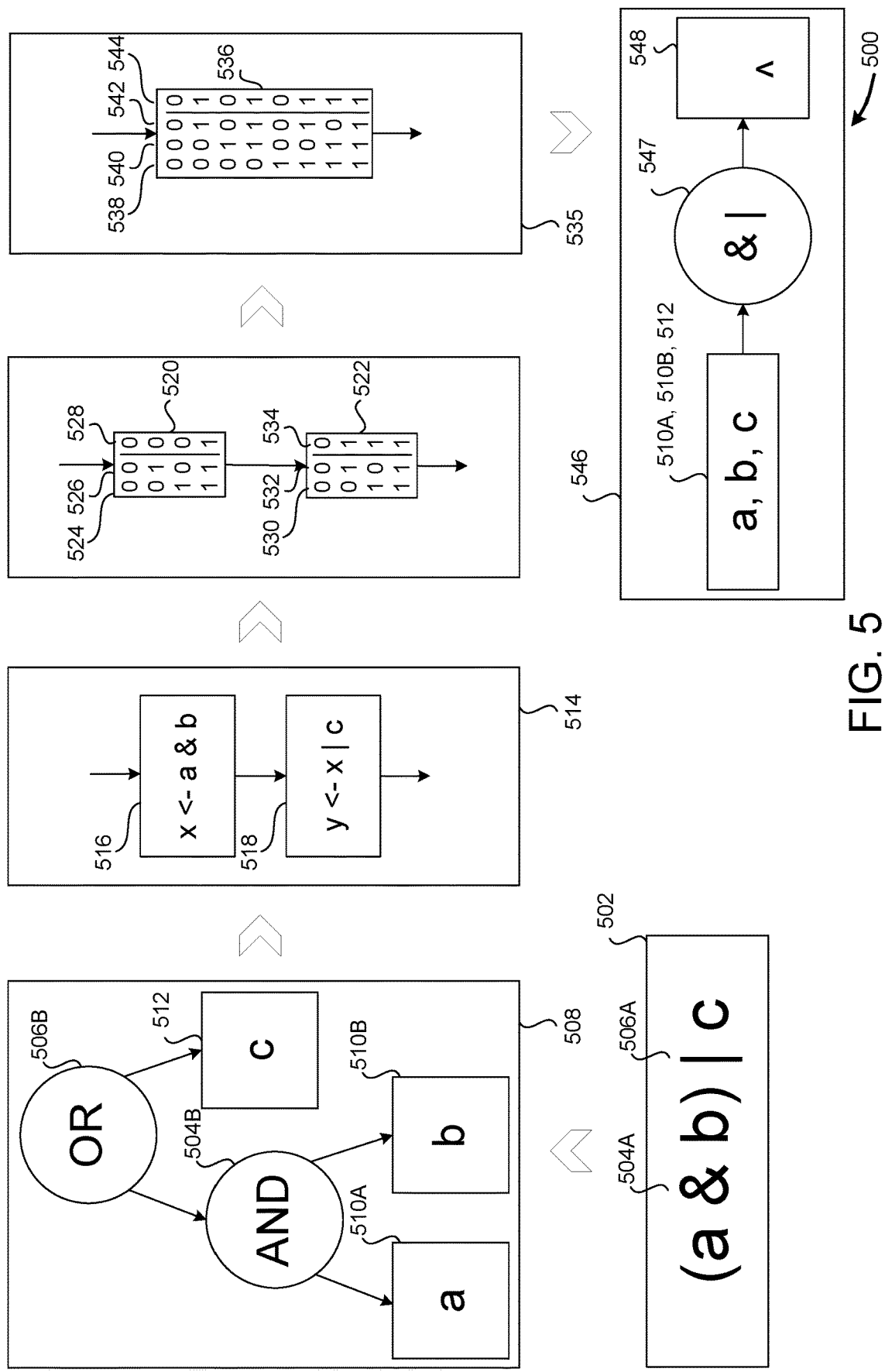
FIG. 5 is a block diagram that shows mapping an expression to an IR and optimizing the IR by merging lookup tables.

FIG. 5 is a block diagram that shows mapping an expression to an IR and optimizing the IR by merging lookup tables. In some configurations, expression 502 is mapped to AST 508 by mapping each operator of the expression to an operator node and each operand of the expression to an operand node. While this example maps an expression to an AST, statements, code blocks, functions, or entire programs are similarly contemplated.

For example, the '&' operator 504A is mapped to "AND" node 504B and the '|' operator 506A maps to "OR" node 506B. In this example, the '&' operator is applied first, and so the operands 'A' and 'B' are mapped to operand nodes 510A and 510B, respectively. The result of the "AND" node 504B, 'X', is an operand of the "OR" node 506B, along with operand node 512 ('C').

Once the AST has been generated, it may be traversed to generate IR 514. As discussed above, an IR may include a set of functions, each of which contains a set of basic blocks, each of which includes a sequence of computational units. The IR is used by compiler 104 to optimize generated code, both the novel techniques disclosed herein and conventional techniques. These techniques may be applied iteratively, such that one optimization may make another, previously inapplicable optimization, possible.

In this example, both computational units 516 and 518 are part of basic block 514. Computational units 516 and 518 implement the AND operator 504B and the OR operator 506B, respectively. In some configurations, computational units 516 and 518 are replaced with LUTs 520 and 522, respectively, which perform the corresponding operations.

A LUT is a truth table that maps each combination of binary input parameters to an output parameter. In LUT 520, column 524 represents the value of 'A', column 526 represents the value of 'B', and column 528 represents value of 'A' AND 'B' (i.e. the result generated by the truth table for a given combination of input values). For example, if 'A=1' and 'B=0', which corresponds to the third row of LUT 520, then the output value is '0'. Similarly, LUT 522 has column 530 which represents the value of 'X', column 532 which represents the value of 'C', and column 534 which represents the value of 'X' OR 'C'.

Once the operator nodes have been replaced with LUTs, the IR may be traversed to determine if any LUTs may be merged. In some configurations, LUTs can be merged if one is an operand of another, and if the combined LUT requires fewer than the maximum number of inputs allowed by the target device. In other configurations, the merge process produces LUTs that require more than the maximum number of inputs allowed by the target SDC. In this case, a subsequent process traverses the IR and breaks down oversized LUTs into two or more smaller LUTs.

For example, basic block 535 depicts LUT 536—the result of merging LUT 520 and LUT 522. Instead of performing two operations, an "AND" 504 followed by an "OR" 506, LUT 536 performs the same functionality with a single operation that takes three parameters, column 538 ('A'), column 540 ('B'), and column 542 ('C'), producing a result in column 544.

Basic block 535 may then be used to generate SDC 546. Circuit 546 may include a computational unit 547 implemented by LUT 536. Computational unit 547 takes as input operands 510A, 510B, and 512 ('A', 'B', and 'C', respectively), and stores the result in register 548.

Figure 6:
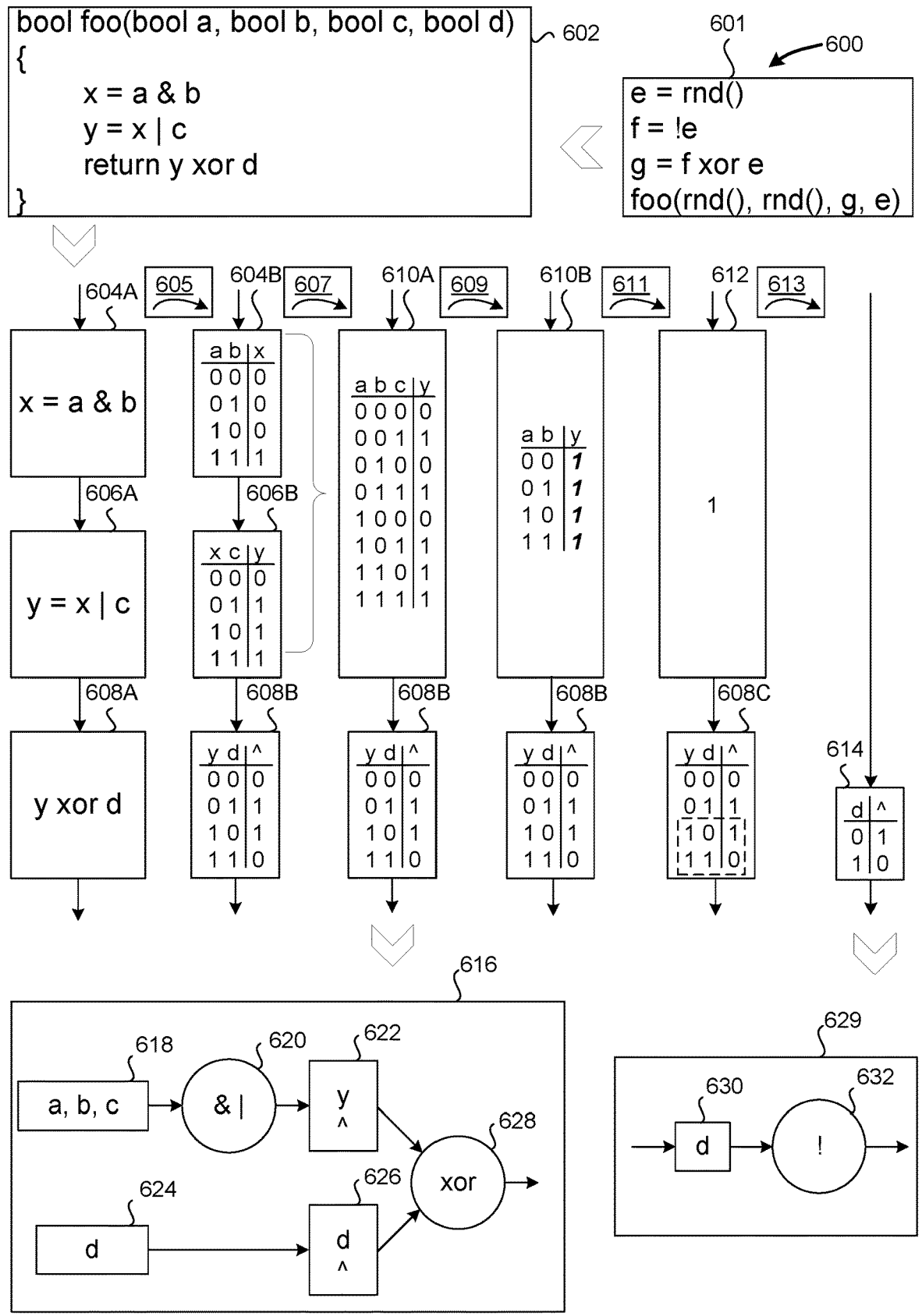
FIG. 6 is a block diagram that shows mapping a more complex expression to an IR.

FIG. 6 is a block diagram 600 that shows mapping a more complex expression to an IR. In this embodiment, it is assumed that the target SDC has three-bit LUTs, meaning each LUT can support no more than three parameters. This restriction is just one example of a LUT capacity, and is chosen to simplify the drawings and description. LUTs of higher and lower capacities are similarly contemplated.

FIG. 6 depicts code block 601 that calls function 'foo( )', which is depicted in code block 602. Code block 601 generates a Boolean variable 'e' at random (i.e. the "md( )" function returns a value of '0' or '1' at random). Next, variable 'f' is set to "not 'e'", i.e. if 'e' is '1' then 'f' is set to '0'. Next, variable 'g' is set to "f xor e", which will always result in a value of '1'. In some embodiments, compiler 104 analyzes the IR associated with code block 601 to make the determination that 'g' will always be '1'. Finally, code block 601 calls function 'foo( )', passing in two random values for parameters 'a' and 'b', the value of 'g' ('1') for parameter 'c', and the value of 'e' for parameter 'd'. While some portions are omitted for clarity, each statement in function 'foo( )' is mapped to a computational unit, e.g. "x=a & b" maps to computational unit 604A, "y=x|c" maps to computational unit 606A, and "return y xor d" maps to computational unit 608A.

Compiler 104 may then perform optimization step 605, replacing computational units 604A-608A with corresponding LUTs 604B-608B. LUT 604 applies the "AND" operator to 'a' and 'b', producing a value for 'x', LUT 606B applies the "OR" operator to 'x' and 'c', producing a value for 'y', and LUT 608B applies the "XOR" operator to 'y' and 'd'. Once this substitution has been completed, compiler 104 may iteratively perform optimizations, each which may deduce information about the LUTs (and other computational units, such as adders, multiplexers, etc.), input variables, and output variables that enable additional optimizations.

For example, compiler 104 may perform optimization 607 by merging LUTs 604A and 604B into LUT 610A, which performs "A & B|C" in a single lookup. This merger is possible because LUT 604B is an input of LUT 606B, and because the resulting LUT 610A does not require more than the maximum number of inputs (three, in this example). LUT 608B is not also merged into LUT 610A because adding an additional parameter (i.e. 'd') would result in a LUT that is too large (i.e. four inputs) for the target SDC.

The compiler 104 may then apply one or more optimizations 609 based on knowing that parameter 'c' is '1'. As discussed above, this knowledge is based on an analysis of code block 601. In order to make this determination, the compiler must know that 'c' has the value of '1' for all invocations of 'foo( )'. If code block 601 contains the only invocation of 'foo( )', then the analysis is complete. Hover, if 'foo( )' is invoked in other locations, the compiler 104 must be able to make a similar determination for the other call sites as well. While FIG. 6 depicts determining a constraint on a variable at the function level (i.e. the constraint is determined at a function boundary), constraints on variables may also be analyzed at the basic block level, as discussed below in conjunction with FIG. 7.

In some configurations, by knowing that 'c' is '1', compiler 104 may eliminate the 'c' input from LUT 610A by removing all rows of LUT 610A in which 'c' is '0' (i.e. by removing the first, third, fifth, and seventh rows of LUT 610A). This leaves LUT 610B, which has two remaining inputs, 'a' and 'b'. By eliminating the 'c' input, the compiler has made LUT 610B available to merge with another LUT.

Compiler 104 may also analyze the outputs of LUT 610B to identify patterns that enable further optimization. For example, compiler 104 may determine that the output is invariant—i.e. the output is the same ('1'), regardless of the values of 'a' and 'b'. Upon making this determination, optimization step 611 may replace LUT 610 with a constant value '1' 612. Other patterns in the output of a merged LUT may be identified, such as a relationship to one of the remaining parameters. For example, the output may be equal to one of the inputs, in which case the LUT can be replaced with the input value (i.e. a register that stores the input value). Similarly, the output may be the opposite of an input, in which case the LUT may be further reduced to a "NOT" operation that is applied to the input.

In some configurations, once the constant value of 'c' has been propagated and used to optimize LUT 610 to know that 'y' always has the value '1', optimization 611 analyzes LUT 608B by splitting LUT 608B into two halves, one in which 'y' is '1' and the other in which 'y' is '0'. Compiler 104 then determines that the return value (i.e the result of LUT 608C) is always the opposite of the value of 'd' (i.e. the return value is "not 'd'" or "!d". As such, optimization step 613 replaces the LUT 612 and 608B with LUT 614, which implements "not 'd'".

FIG. 6 includes two circuit diagrams, 616 and 629 illustrating the additional optimization possible by combining input removal optimization (i.e. optimization steps 611 and 613) with LUT merging optimization. Circuit diagram 616 depicts how the circuit would be implemented after optimization step 607. Hardware circuit 616 is a pipeline with two stages. The first stage performs an "&|" operation 620 (i.e. an "AND then OR" operation) on variables 'a', 'b', and 'c' 618. The result of the first stage is stored in register 622. During the first stage, the variable 'd' 624 is stored in register 626. Then, the second stage performs the "XOR" operation 628 on the result of the "AND then OR" operation 620 and variable "d".

However, circuit diagram 629 depicts the circuit resulting from the full course of optimizations. Hardware circuit 629 has a single stage that applies the '!' operator ("NOT" operator) to 'd' 630. One of ordinary skill will appreciate the significant reduction in SDC area, the reduction in the number of stages, and the potential to remove variables such as 'c' or 'y' from the IR. Furthermore, by removing an input variable (i.e. by removing 'y' from LUT 608B), LUT capacity is freed to perform additional merges. For instance, if, instead of returning "y xor d", code block 602 included additional statements, then additional computational operators could be merged into LUT 614.

Figure 7:
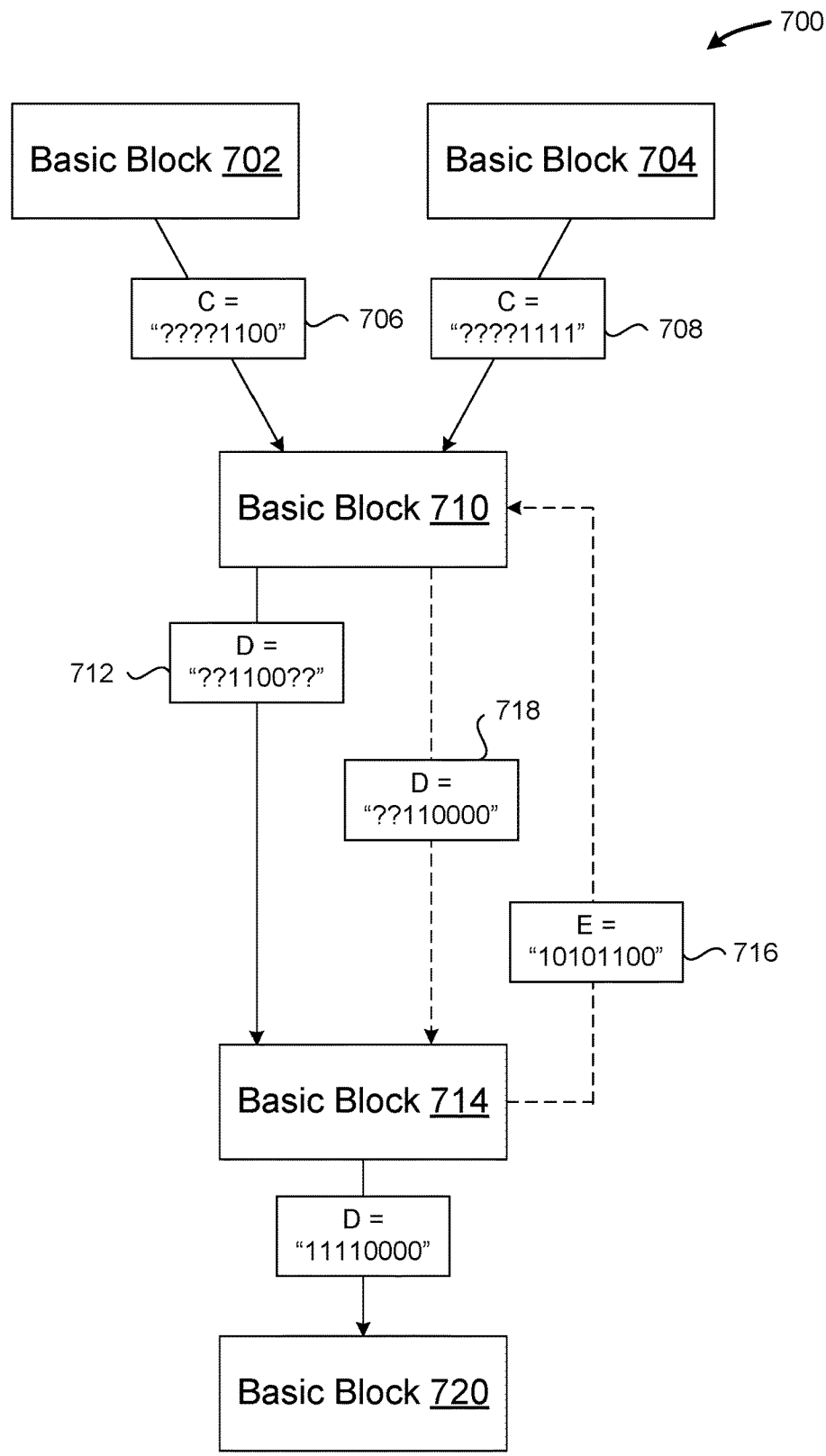
FIG. 7 is a block diagram that shows a basic block analysis of variables including a loop formed by a backwards link.

FIG. 7 is a block diagram 700 that shows a basic block analysis of variables including a loop formed by a backwards link (i.e. "backlink"). A basic block is a section of code that, once entered, has only one exit. Basic block analysis is used to identify constraints in variables, e.g. whether variable 'c is always 1, or if "a XOR b" is always '0'.

In some configurations, basic block analysis performs a control flow analysis on program source code 102. This analysis identifies basic blocks, such as basic blocks 702, 704, 710, 714, and 720. The analysis also determines when execution may pass from one basic block to another. For example, execution may pass from basic block 702 to basic block 710, but not from basic block 710 to basic block 702 and not from basic block 702 to basic block 704.

In some configurations, basic block analysis then identifies constraints on a given variable by determining if all predecessor blocks provide the same value to the given variable. One technique for identifying these constraints is constant propagation—the process of substituting the values of known constants at compile time. However, other types of constraints may also be determined, including multi-variable constraints, where a constraint may depend on the values of two or more variables (e.g. 'A XOR B' is always 0). Other constraint detection techniques include common subexpression elimination (i.e. replacing duplicate expressions with a constant value) and dead store elimination (i.e. identifying variables that are assigned to but never used).

Constraint analysis may be performed for each bit of a multi-bit variable. For example, an analysis of block 702 may determine that the value of 'C' 706 is constrained to "????1100", where a '?' indicates the value of a bit is unknown, a '1' indicates the value of a bit is always a '1', and a '0' indicates the value of a bit is always a '0'. Similarly, an analysis of block 704 may indicate that 'C' 708 is constrained to "????1111".

Thus, when execution comes from block 702, 'C' is known to be '0' for the first two bits (in positions zero and one), while the bits in positions two and three are known to be '1'. However, because 'C' may also be provided by basic block 704, in which case bits zero through three are '1', only the values of positions two and three can be constrained to a value ('1').

Basic block 710 is the beginning of a loop that provides additional opportunities for constraints to flow between basic blocks, enabling additional variables to be omitted from LUTs, which allows more operations to be merged. An initial analysis of basic block 710 may reveal that 'D' is constrained 712 to "??1100?". Basic block 714 may then be analyzed given this constraint, and determine that variable 'E' is constrained 716 to "10101100". However, 'E' is also provided as input to basic block 710 (e.g. as a loop counter), and so this constraint can be used to further analyze basic block 710. In some embodiments, constraint 718 for 'D', "??110000" may be determined. This analysis may continue, as it is possible that the new constraint on 'D' will reveal additional constraints on additional variables.

Once constraints converge on stable values for basic block 714, the analysis may proceed. LUT optimization may be performed based on the constraints derived for the basic blocks.

Figure 8:
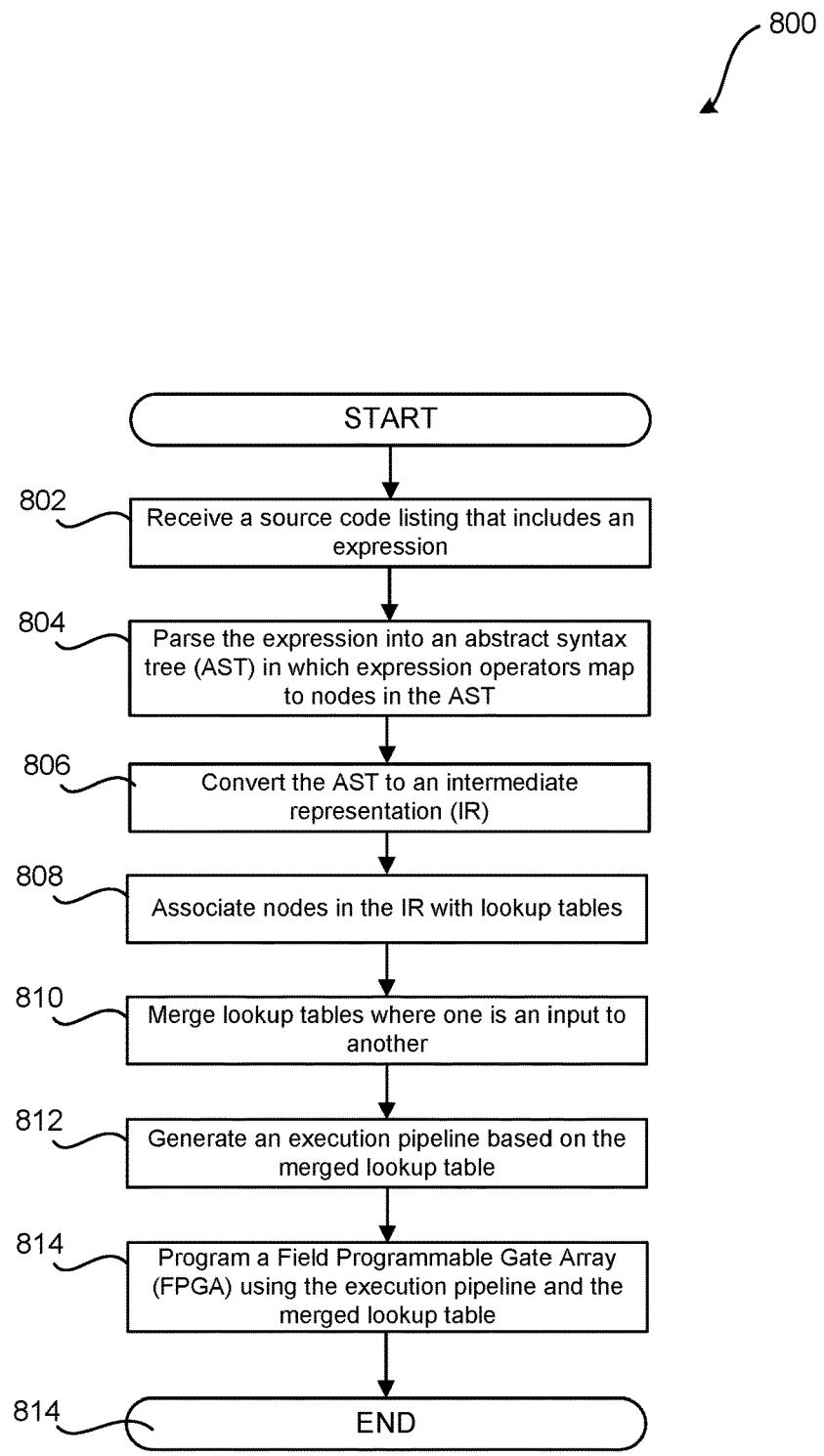
FIG. 8 is a flow diagram showing a routine that illustrates aspects of the operation of the system for LUT optimization described with reference to FIGS. 1-7.

FIG. 8 is a flow diagram showing a routine 800 that illustrates aspects of the system for LUT optimization for programming languages that target SDCs illustrated in FIGS. 1-7 and described above, according to one embodiment disclosed herein. It should be appreciated that the logical operations described herein with regard to FIG. 7, and the other FIGS., can be implemented (1) as a sequence of computer implemented acts or program modules running on a computing device and/or (2) as interconnected machine logic circuits or circuit modules within a computing device.

The particular implementation of the technologies disclosed herein is a matter of choice dependent on the performance and other requirements of the computing device. Accordingly, the logical operations described herein are referred to variously as states, operations, structural devices, acts, or modules. These states, operations, structural devices, acts and modules can be implemented in hardware, software, firmware, in special-purpose digital logic, and any combination thereof. It should be appreciated that more or fewer operations can be performed than shown in the FIGS. and described herein. These operations can also be performed in a different order than those described herein.

The routine 800 begins at operation 802, where a source code listing is received. In some configurations, the source code listing includes one or more expressions, e.g. one or more operators and associated operands, function calls and associated parameters, etc.

The routine 800 continues at operation 804, where the one or more expressions are parsed into an AST. The AST may include nodes for operators identified within the one or more expressions, as well as nodes for operands. Similarly, the AST may include nodes for function calls, and associated nodes for function parameters.

The routine 800 continues at operation 806, where operator nodes in the AST are converted to an IR.

The routine 800 continues at operation 808, where operators in the IR are replaced with LUTs that perform the operation. For example, the '^' operator indicates a bitwise 'XOR', and so an 'XOR' node may be associated with a LUT that performs the 'XOR' operation. Some operators may have two parameters, in which case they are associated with two-parameter LUTs. However, operators with any number of parameters are similarly contemplated.

The routine 800 continues at operation 810, where adjacent lookup tables are merged in the IR. In some configurations, lookup tables are considered adjacent when one is an operand of the other. For example, in the expression "(A & B)|C", the '&' and '|' operators are adjacent because the '&' operator is an operand of the '|' operator.

Additional constraints may be applied to merges. For example, when LUTs are merged, the input values provided to the individual LUTs will be routed to the merged LUT. As such, LUTs will only be merged if the total number of parameters is less than a defined maximum number of LUT parameters for the targeted SDC.

The routine 800 continues at operation 812, where an execution pipeline is generated by placing the merged LUT into a single pipeline stage. This may result in fewer pipeline stages being used to perform the same operations.

The routine 800 continues at operation 814, where an SDC is programmed based on the generated execution pipeline. After operation 814, the routine 800 proceeds to operation 816, where it ends.

Figure 9:
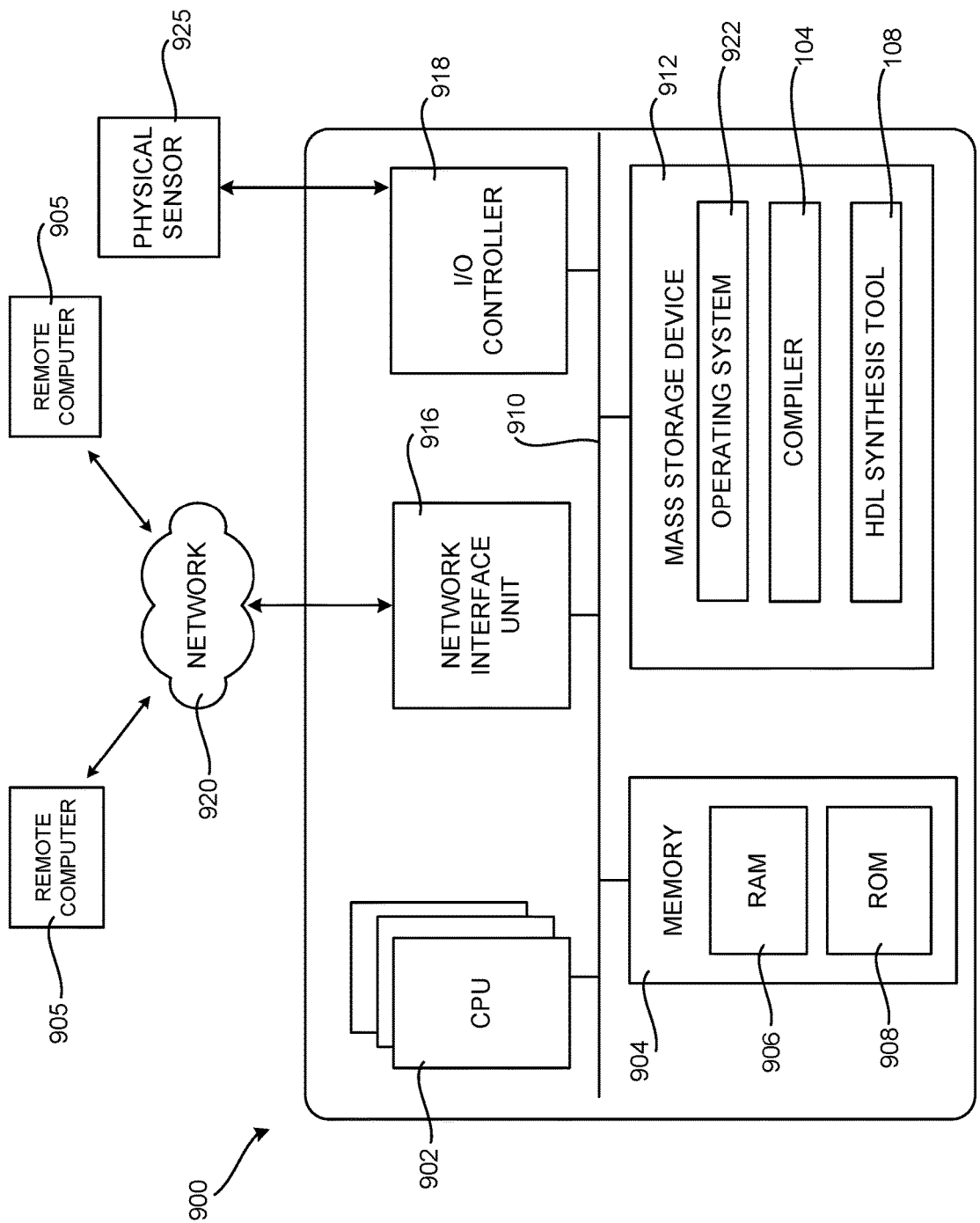
FIG. 9 is a computer architecture diagram showing an illustrative computer hardware and software architecture for a computing device that can implement aspects of the technologies presented herein.

FIG. 9 is a computer architecture diagram showing an illustrative computer hardware and software architecture for a computing device that can implement the various technologies presented herein. In particular, the architecture illustrated in FIG. 9 can be utilized to implement a server computer, mobile phone, an e-reader, a smartphone, a desktop computer, an AR/VR device, a tablet computer, a laptop computer, or another type of computing device.

The computer 900 illustrated in FIG. 9 includes a central processing unit 902 ("CPU"), a system memory 904, including a random-access memory 906 ("RAM") and a read-only memory ("ROM") 908, and a system bus 910 that couples the memory 904 to the CPU 902. A basic input/output system ("BIOS" or "firmware") containing the basic routines that help to transfer information between elements within the computer 900, such as during startup, can be stored in the ROM 908. The computer 900 further includes a mass storage device 912 for storing an operating system 922, application programs, and other types of programs. The mass storage device 912 can also be configured to store other types of programs and data.

The mass storage device 912 is connected to the CPU 902 through a mass storage controller (not shown) connected to the bus 910. The mass storage device 912 and its associated computer readable media provide non-volatile storage for the computer 900. Although the description of computer readable media contained herein refers to a mass storage device, such as a hard disk, CD-ROM drive, DVD-ROM drive, or USB storage key, it should be appreciated by those skilled in the art that computer readable media can be any available computer storage media or communication media that can be accessed by the computer 900.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, radio frequency, infrared and other wireless media. Combinations of the any of the above should also be included within the scope of computer readable media.

By way of example, and not limitation, computer storage media can include volatile and non-volatile, removable and non-removable media implemented in any method or technology for storage of information such as computer readable instructions, data structures, program modules or other data. For example, computer storage media includes, but is not limited to, RAM, ROM, EPROM, EEPROM, flash memory or other solid-state memory technology, CD-ROM, digital versatile disks ("DVD"), HD-DVD, BLU-RAY, or other optical storage, magnetic cassettes, magnetic tape, magnetic disk storage or other magnetic storage devices, or any other medium that can be used to store the desired information and which can be accessed by the computer 900. For purposes of the claims, the phrase "computer storage medium," and variations thereof, does not include waves or signals per se or communication media.

According to various configurations, the computer 900 can operate in a networked environment using logical connections to remote computers through a network such as the network 920. The computer 900 can connect to the network 920 through a network interface unit 916 connected to the bus 910. It should be appreciated that the network interface unit 916 can also be utilized to connect to other types of networks and remote computer systems. The computer 900 can also include an input/output controller 918 for receiving and processing input from a number of other devices, including a keyboard, mouse, touch input, an electronic stylus (not shown in FIG. 9), or a physical sensor such as a video camera. Similarly, the input/output controller 918 can provide output to a display screen or other type of output device (also not shown in FIG. 9).

It should be appreciated that the software components described herein, when loaded into the CPU 902 and executed, can transform the CPU 902 and the overall computer 900 from a general-purpose computing device into a special-purpose computing device customized to facilitate the functionality presented herein. The CPU 902 can be constructed from any number of transistors or other discrete circuit elements, which can individually or collectively assume any number of states. More specifically, the CPU 902 can operate as a finite-state machine, in response to executable instructions contained within the software modules disclosed herein. These computer-executable instructions can transform the CPU 902 by specifying how the CPU 902 transitions between states, thereby transforming the transistors or other discrete hardware elements constituting the CPU 902.

Encoding the software modules presented herein can also transform the physical structure of the computer readable media presented herein. The specific transformation of physical structure depends on various factors, in different implementations of this description. Examples of such factors include, but are not limited to, the technology used to implement the computer readable media, whether the computer readable media is characterized as primary or secondary storage, and the like. For example, if the computer readable media is implemented as semiconductor-based memory, the software disclosed herein can be encoded on the computer readable media by transforming the physical state of the semiconductor memory. For instance, the software can transform the state of transistors, capacitors, or other discrete circuit elements constituting the semiconductor memory. The software can also transform the physical state of such components in order to store data thereupon.

As another example, the computer readable media disclosed herein can be implemented using magnetic or optical technology. In such implementations, the software presented herein can transform the physical state of magnetic or optical media, when the software is encoded therein. These transformations can include altering the magnetic characteristics of particular locations within given magnetic media. These transformations can also include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer 900 in order to store and execute the software components presented herein. It also should be appreciated that the architecture shown in FIG. 9 for the computer 900, or a similar architecture, can be utilized to implement other types of computing devices, including hand-held computers, video game devices, embedded computer systems, mobile devices such as smartphones, tablets, and AR/VR devices, and other types of computing devices known to those skilled in the art. It is also contemplated that the computer 900 might not include all of the components shown in FIG. 9, can include other components that are not explicitly shown in FIG. 9, or can utilize an architecture completely different than that shown in FIG. 9.

Figure 10:
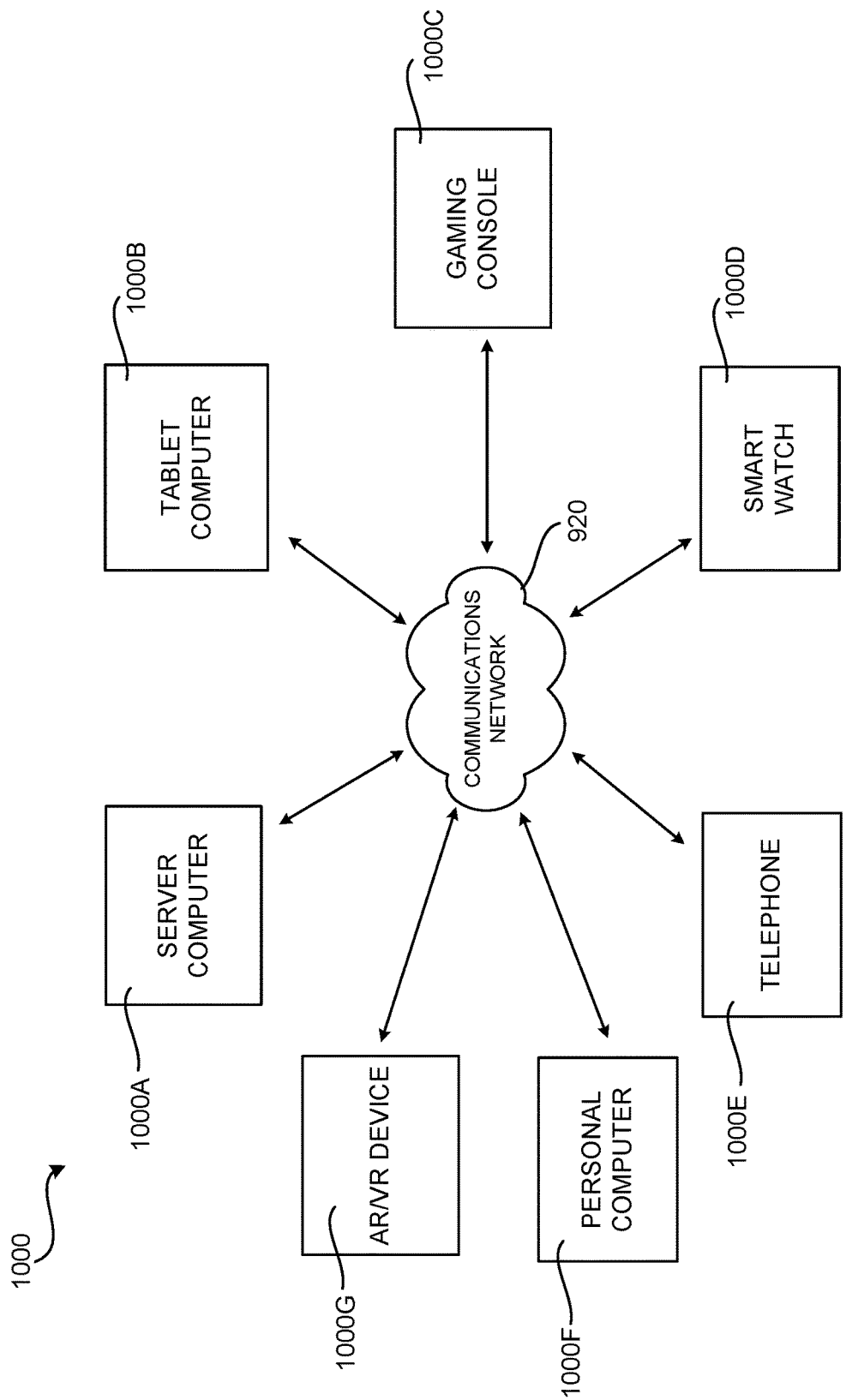
FIG. 10 is a network diagram illustrating a distributed computing environment in which aspects of the disclosed technologies can be implemented.

FIG. 10 is a network diagram illustrating a distributed network computing environment 1000 in which aspects of the disclosed technologies can be implemented, according to various embodiments presented herein. As shown in FIG. 10, one or more server computers 1000A can be interconnected via a communications network 920 (which may be either of, or a combination of, a fixed-wire or wireless LAN, WAN, intranet, extranet, peer-to-peer network, virtual private network, the Internet, Bluetooth communications network, proprietary low voltage communications network, or other communications network) with a number of client computing devices such as, but not limited to, a tablet computer 1000B, a gaming console 1000C, a smart watch 1000D, a telephone 1000E, such as a smartphone, a personal computer 1000F, and an AR/VR device 1000G.

In a network environment in which the communications network 920 is the Internet, for example, the server computer 1000A can be a dedicated server computer operable to process and communicate data to and from the client computing devices 1000B-1000G via any of a number of known protocols, such as, hypertext transfer protocol ("HTTP"), file transfer protocol ("FTP"), or simple object access protocol ("SOAP"). Additionally, the networked computing environment 1000 can utilize various data security protocols such as secured socket layer ("SSL") or pretty good privacy ("PGP"). Each of the client computing devices 1000B-1000G can be equipped with an operating system operable to support one or more computing applications or terminal sessions such as a web browser (not shown in FIG. 10), or other graphical user interface (not shown in FIG. 10), or a mobile desktop environment (not shown in FIG. 10) to gain access to the server computer 1000A.

The server computer 1000A can be communicatively coupled to other computing environments (not shown in FIG. 10) and receive data regarding a participating user's interactions/resource network. In an illustrative operation, a user (not shown in FIG. 10) may interact with a computing application running on a client computing device 1000B-1000G to obtain desired data and/or perform other computing applications.

The data and/or computing applications may be stored on the server 1000A, or servers 1000A, and communicated to cooperating users through the client computing devices 1000B-1000G over an exemplary communications network 920. A participating user (not shown in FIG. 10) may request access to specific data and applications housed in whole or in part on the server computer 1000A. These data may be communicated between the client computing devices 1000B-1000G and the server computer 1000A for processing and storage.

The server computer 1000A can host computing applications, processes and applets for the generation, authentication, encryption, and communication of data and applications, and may cooperate with other server computing environments (not shown in FIG. 10), third party service providers (not shown in FIG. 10), network attached storage ("NAS") and storage area networks ("SAN") to realize application/data transactions.

It should be appreciated that the computing architecture shown in FIG. 9 and the distributed network computing environment shown in FIG. 10 have been simplified for ease of discussion. It should also be appreciated that the computing architecture and the distributed computing network can include and utilize many more computing components, devices, software programs, networking devices, and other components not specifically described herein.

The disclosure presented herein also encompasses the subject matter set forth in the following clauses:

Clause 1: A computer-implemented method executing on a computing device, comprising: receiving a source code listing comprising an expression; parsing the expression into an intermediate representation comprising computational units that map to operators in the expression; associating at least two computational units in the intermediate representation with lookup tables; merging lookup tables in the intermediate representation into a merged lookup table; defining an execution pipeline by assigning the merged lookup table to a stage in the execution pipeline; and programming a synchronous digital circuit based on the execution pipeline and the merged lookup table.

Clause 2: The computer-implemented method of clause 1, wherein merging adjacent lookup tables comprises merging a first lookup table with a second lookup table, and wherein the merged lookup table generates a same output as the first lookup table and the second lookup table for a given input.

Clause 3: The computer-implemented method of any of clauses 1-2, wherein adjacent lookup tables are iteratively combined until a defined maximum number of inputs in the merged lookup table are used.

Clause 4: The computer-implemented method of any of clauses 1-3, wherein the expression is analyzed on a per-bit basis.

Clause 5: The computer-implemented method of any of clauses 1-4, wherein bits of the expression are analyzed independently to identify a constraint on a variable in the expression.

Clause 6: The computer-implemented method of any of clauses 1-5, wherein the constraint is determined by analyzing a value of the variable as provided by one or more predecessor basic blocks.

Clause 7: The computer-implemented method of any of clauses 1-6, wherein the constraint indicates the variable has a particular value for the expression.

Clause 8: The computer-implemented method of any of clauses 1-7, wherein the merged lookup table has the constrained variable as an input parameter, and wherein the merged lookup table is modified to omit the variable.

Clause 9: A computing device: one or more processors; and at least one computer storage medium having computer executable instructions stored thereon which, when executed by the one or more processors, cause the computing device to: receive a source code listing comprising an expression; parse the expression into an intermediate representation comprising computational units that map to operators in the expression; associate at least two computational units in the intermediate representation with lookup tables; for each bit in the expression: merge adjacent lookup tables in the intermediate representation into a merged lookup table; define an execution pipeline by assigning the merged lookup table to a stage in the execution pipeline; and program a synchronous digital circuit based on the execution pipeline and the merged lookup table.

Clause 10: The computing device of clause 9, wherein the adjacent lookup tables comprise a first lookup table and a second lookup table, and wherein the first lookup table is adjacent to the second lookup table when the output of the first lookup table is an input to the second lookup table.

Clause 11: The computing device of any of clauses 9-10, wherein bits of the expression are analyzed independently to identify a constraint on a variable in the expression.

Clause 12: The computing device of any of clauses 9-11, wherein the constraint is determined by a subexpression elimination analysis, a dead store elimination analysis, or a constant propagation analysis on the expression.

Clause 13: The computing device of any of clauses 9-12, wherein the source code listing is parsed to identify a plurality of basic blocks including a cycle of basic blocks associated with a loop, and wherein the constraint is determined by analyzing a value of the variable as it propagates through the cycle of basic blocks.

Clause 14: The computing device of any of clauses 9-13, wherein merging adjacent lookup tables includes merging a first lookup table with a second lookup table, and wherein the merged lookup table generates a same output as the first lookup table and the second lookup table for a given input.

Clause 15: At least one computer storage medium having computer executable instructions stored thereon which, when executed by one or more processors, cause a communal computing device to: receive a source code listing comprising an expression; parse the source code listing into an intermediate representation comprising computational units that map to operators in the expression; associate at least two computational units in the intermediate representation with lookup tables; for each bit in the expression: determine a constraint on a variable in the expression; merge adjacent lookup tables in the intermediate representation into a merged lookup table based in part on the constraint; define an execution pipeline by assigning the merged lookup table to a stage in the execution pipeline; and program a synchronous digital circuit based on the execution pipeline and the merged lookup table.

Clause 16: The at least one computer storage medium of clause 15, wherein lookup tables that are adjacent are iteratively combined and input parameters to the lookup tables are iteratively omitted until a defined maximum number of inputs in the merged lookup table are used.

Clause 17: The at least one computer storage medium of any of clauses 15-16, wherein each bit of the expression is analyzed independently to identify a constraint on a variable in the expression.

Clause 18: The at least one computer storage medium of any of clauses 15-17, wherein the constraint is determined by analyzing a value of the variable as provided by one or more predecessor basic blocks.

Clause 19: The at least one computer storage medium of any of clauses 15-18, wherein the constraint indicates the variable has a particular value for the expression.

Clause 20: The at least one computer storage medium of any of clauses 15-19, wherein a lookup table having the constrained variable as an input parameter is modified to omit the variable.

Based on the foregoing, it should be appreciated that a system for LUT optimization for programming languages that target SDCs has been disclosed herein. Although the subject matter presented herein has been described in language specific to computer structural features, methodological and transformative acts, specific computing machinery, and computer readable media, it is to be understood that the subject matter set forth in the appended claims is not necessarily limited to the specific features, acts, or media described herein. Rather, the specific features, acts and mediums are disclosed as example forms of implementing the claimed subject matter.

The subject matter described above is provided by way of illustration only and should not be construed as limiting. Various modifications and changes can be made to the subject matter described herein without following the example configurations and applications illustrated and described, and without departing from the scope of the present disclosure, which is set forth in the following claims.

What is claimed is:

1. A computer-implemented method executing on a computing device, comprising:
receiving a source code listing comprising an expression;
parsing the expression into an intermediate representation comprising a first lookup table that performs a first operator in the expression and a second lookup table that performs a second operator in the expression;
merging the first lookup table and the second lookup table into a merged lookup table that performs the first operator and the second operator;
defining an execution pipeline that implements the expression, wherein the execution pipeline includes a plurality of pipeline stages, wherein a pipeline stage of the plurality of pipeline stages receives an input value from a first register, performs an operation based in part on the input value and the merged lookup table, and provides an output value to a second register; and
programming a synchronous digital circuit to implement the execution pipeline.

2. The computer-implemented method of claim 1, wherein the first lookup table maps a first set of input variables to a first output variable, wherein the second lookup table maps a second set of input variables to a second output variable, wherein the second set of input variables includes the first output variable, and wherein the merged lookup table maps at least some input variables of the first and second sets of input variables to the second output variable.

3. The computer-implemented method of claim 1, wherein the intermediate expression includes additional lookup tables, and wherein the additional lookup tables are iteratively merged into the merged lookup table until a defined maximum number of inputs to the merged lookup table are used.

4. The computer-implemented method of claim 1, wherein the expression includes a lookup table input variable comprising multiple bits, wherein a plurality of merged lookup tables are generated, one for each of the multiple bits, the method further comprising:
analyzing the expression to identify bits of the multiple bits that have constrained values; and
omitting the lookup table input variable from merged lookup tables associated with constrained bits of the lookup table input variable.

5. The computer-implemented method of claim 1, wherein the expression is analyzed on a bitwise basis to identify a constraint on a variable in the expression.

6. The computer-implemented method of claim 5, wherein the constraint is determined by analyzing a value of the variable as provided by one or more predecessor basic blocks, each of which includes a sequence of computational operations.

7. The computer-implemented method of claim 5, wherein the constraint indicates the variable has a particular value for the expression.

8. The computer-implemented method of claim 7, wherein the merged lookup table has the constrained variable as an input parameter, and wherein the merged lookup table is modified to omit the variable.

9. A computing device, comprising:
one or more processors; and
at least one computer storage medium having computer executable instructions stored thereon which, when executed by the one or more processors, cause the computing device to:
receive a source code listing comprising an expression that includes a plurality of operators;
parse the expression into an intermediate representation comprising lookup tables that implement corresponding operators of the plurality of operators of the expression;
on a bitwise basis:
merge two or more lookup tables into a merged lookup table;
define an execution pipeline that implements the expression, wherein the execution pipeline includes a plurality of stages, wherein, over a clock cycle, a pipeline stage of the plurality of pipeline stages receives an input value from a first register, performs an operation based in part on the input value and the merged lookup table, and provides an output value to a second register; and
program a synchronous digital circuit to implement the execution pipeline.

10. The computing device of claim 9, wherein the two or more lookup tables comprise a first lookup table and a second lookup table, and wherein the first lookup table is merged with the second lookup table when an output variable of the first lookup table is an input variable to the second lookup table.

11. The computing device of claim 9, wherein lookup tables are generated for each bit position of each operator, and wherein the instructions further cause the computing device to:
identify a constraint on one bit of a variable in the expression; and omit the variable from the merged lookup table associated with the bit position of the one bit of the variable.

12. The computing device of claim 11, wherein the constraint is determined by a subexpression elimination analysis, a dead store elimination analysis, or a constant propagation analysis on the expression.

13. The computing device of claim 11, wherein the source code listing is parsed to identify a plurality of basic blocks including a cycle of basic blocks associated with a loop, and wherein the constraint is determined by analyzing a value of the variable as it propagates through the cycle of basic blocks.

14. The computing device of claim 11, wherein merging two or more lookup tables includes merging a first lookup table with a second lookup table, and wherein the merged lookup table generates a same output as the first lookup table and the second lookup table for a given input.

15. At least one computer storage medium having computer executable instructions stored thereon which, when executed by one or more processors, cause a communal computing device to:
receive a source code listing comprising an expression;
parse the source code listing into an intermediate representation comprising lookup tables that implement operators found in the expression, wherein the lookup tables include a first lookup table, a second lookup table, a third lookup table, and a fourth lookup table;
on a bitwise basis:
    determine a constraint on a variable in the expression;
    merge the first lookup table and the second lookup table into a first merged lookup table;
    based in part on the constraint, omit from the first merged lookup table one or more bits of a first input value associated with the first lookup table;
    merge the third lookup table and the fourth lookup table into a second merged lookup table;
    define an execution pipeline that implements the expression, wherein the execution pipeline includes a plurality of stages, wherein a first pipeline stage of the plurality of pipeline stages receives the first input value from a first register, performs a first operation based in part on the first input value and the first merged lookup table, and provides a first output value to a second register, and wherein a second pipeline stage of the plurality of pipeline stages receives the first output value from the second register as a second input value, performs a second operation based in part on the second input value and the second merged lookup table, and provides a second output value to a third register; and
    program a synchronous digital circuit to implement the execution pipeline.

16. The at least one computer storage medium of claim 15, wherein additional lookup tables are iteratively merged with the first merged lookup table until a defined maximum number of inputs of the first merged lookup table are used.

17. The at least one computer storage medium of claim 15, wherein each bit of the expression is analyzed independently to identify a constraint on a variable in the expression.

18. The at least one computer storage medium of claim 15, wherein the constraint is determined by analyzing a value of the variable as provided by one or more predecessor basic blocks.

19. The at least one computer storage medium of claim 15, wherein the constraint indicates the variable has a particular value for the expression.

20. The at least one computer storage medium of claim 15, wherein a lookup table having the constrained variable as an input parameter is modified to omit the variable.

* * * * *